US008295983B2

(12) United States Patent
Pasch et al.

(10) Patent No.: US 8,295,983 B2
(45) Date of Patent: Oct. 23, 2012

(54) APPARATUS AND METHOD FOR CHARACTERIZATION AND CONTROL OF USAGE DISTURBANCES IN A USAGE ENVIRONMENT OF PRINTERS AND OTHER DYNAMIC SYSTEMS

(75) Inventors: Kenneth A. Pasch, Dover, MA (US); Neil C. Singer, Armonk, NY (US); Mark Tanquary, Needham, MA (US)

(73) Assignee: Silent Printer Holdings, LLC, Armonk, NY (US)

( * ) Notice: Subject to any disclaimer, the term of this patent is extended or adjusted under 35 U.S.C. 154(b) by 675 days.

(21) Appl. No.: 12/268,025

(22) Filed: Nov. 10, 2008

(65) Prior Publication Data

US 2010/0121468 A1 May 13, 2010

(51) Int. Cl.

| | |
|---|---|
| ***G05B 21/00*** | (2006.01) |
| ***G05B 13/00*** | (2006.01) |
| ***G05B 15/00*** | (2006.01) |
| ***G01M 1/38*** | (2006.01) |
| ***G05D 23/00*** | (2006.01) |
| ***G01L 1/00*** | (2006.01) |
| ***G01L 3/00*** | (2006.01) |
| ***G01L 5/00*** | (2006.01) |
| ***G06F 11/30*** | (2006.01) |
| ***G21C 17/00*** | (2006.01) |
| ***G01H 11/00*** | (2006.01) |

(52) U.S. Cl. ............. 700/280; 702/41; 702/56; 702/183

(58) Field of Classification Search .................... 700/28, 700/29, 38, 39, 280; 702/33, 35, 41, 56, 702/182, 183; 318/560, 563, 565, 566, 611; 396/52, 53, 55; 399/91; 400/283, 355; 73/570, 73/572, 574, 576, 579, 649, 651; 101/483–486

See application file for complete search history.

(56) References Cited

U.S. PATENT DOCUMENTS

| | | | | |
|---|---|---|---|---|
| 4,573,363 | A | | 3/1986 | Shin |
| 4,782,446 | A | * | 11/1988 | Ehler et al. ...................... 702/14 |
| 4,916,635 | A | | 4/1990 | Singer et al. |
| 5,195,046 | A | * | 3/1993 | Gerardi et al. .................. 702/35 |
| 5,240,336 | A | * | 8/1993 | Shiraishi et al. .............. 400/693 |
| 5,638,267 | A | | 6/1997 | Singhose et al. |
| 5,689,737 | A | * | 11/1997 | Kanbara ......................... 396/52 |
| 5,720,222 | A | * | 2/1998 | Reichardt et al. ............. 101/216 |
| 5,924,809 | A | | 7/1999 | Wotton et al. |
| 5,964,542 | A | | 10/1999 | Ruhe et al. |
| 6,004,050 | A | | 12/1999 | Rehman et al. |

(Continued)

FOREIGN PATENT DOCUMENTS

EP 0 219 828 B1 4/1987

(Continued)

*Primary Examiner* — Crystal J Barnes-Bullock

(74) *Attorney, Agent, or Firm* — Oblon, Spivak, McClelland, Maier & Neustadt, L.L.P.

(57) ABSTRACT

Dynamic systems with moving parts, such as printers and image forming apparatuses, for example, can shake as a result of reaction forces related to carriage movement. The characteristics of the shake are related to the particular usage environment and, therefore, can be different for the same dynamic system used in different environments. When the shake of a dynamic system is characterized while the dynamic system is in its particular usage environment, the shake can be reduced, for example, based on a degree of control specified by an operator, for every use in that same environment through adjustments based on the characterization.

27 Claims, 4 Drawing Sheets

U.S. PATENT DOCUMENTS

| | | | | |
|---|---|---|---|---|
| 6,055,391 | A * | 4/2000 | Jackson et al. | 399/91 |
| 6,101,058 | A * | 8/2000 | Morris | 360/69 |
| 6,134,006 | A * | 10/2000 | Telschow et al. | 356/503 |
| 6,244,765 | B1 | 6/2001 | Harriman et al. | |
| 6,279,827 | B1 * | 8/2001 | Yeckley | 235/449 |
| 6,289,735 | B1 * | 9/2001 | Dister et al. | 73/579 |
| 6,295,510 | B1 * | 9/2001 | Discenzo | 702/183 |
| 6,314,473 | B1 | 11/2001 | Singer et al. | |
| 6,433,550 | B1 * | 8/2002 | Kinanen | 324/320 |
| 6,471,425 | B1 * | 10/2002 | Cornelius et al. | 400/283 |
| 6,507,165 | B2 * | 1/2003 | Kato et al. | 318/611 |
| 6,560,658 | B2 | 5/2003 | Singer et al. | |
| 6,615,110 | B2 * | 9/2003 | Matsuo et al. | 700/245 |
| 6,633,821 | B2 * | 10/2003 | Jackson et al. | 702/56 |
| 6,822,415 | B1 * | 11/2004 | Komiya et al. | 318/629 |
| 6,900,407 | B2 * | 5/2005 | Mohri et al. | 219/69.16 |
| 6,924,888 | B2 * | 8/2005 | Steinbichler et al. | 356/35.5 |
| 7,043,376 | B2 * | 5/2006 | Chuang | 702/56 |
| 7,072,777 | B1 * | 7/2006 | Wakui et al. | 702/56 |
| 7,130,444 | B2 * | 10/2006 | Honsinger et al. | 382/100 |
| 7,209,793 | B2 * | 4/2007 | Harmse et al. | 700/29 |
| 7,214,916 | B2 * | 5/2007 | Baumgart et al. | 250/203.6 |
| 7,239,263 | B1 * | 7/2007 | Sawa | 342/25 F |
| 7,291,999 | B2 * | 11/2007 | Huang | 318/563 |
| 7,302,852 | B2 * | 12/2007 | Chien | 73/643 |
| 7,433,144 | B2 | 10/2008 | Singer | |
| 7,467,838 | B2 * | 12/2008 | Folkins et al. | 347/14 |
| 7,478,593 | B2 * | 1/2009 | Hefftler et al. | 101/484 |
| 7,501,783 | B2 * | 3/2009 | Imadu et al. | 318/611 |
| 7,532,951 | B2 * | 5/2009 | Sato | 700/280 |
| 7,854,167 | B2 * | 12/2010 | Hashiba et al. | 73/572 |
| 7,878,066 | B2 * | 2/2011 | Scheibner et al. | 73/651 |
| 7,881,814 | B2 * | 2/2011 | Pearson et al. | 700/29 |
| 7,882,394 | B2 * | 2/2011 | Hosek et al. | 714/26 |
| 7,962,086 | B2 * | 6/2011 | Kato | 399/351 |
| 2002/0015163 | A1 | 2/2002 | Singer et al. | |
| 2005/0113025 | A1 | 5/2005 | Akamatsu et al. | |
| 2006/0193672 | A1 | 8/2006 | Saito et al. | |
| 2007/0067678 | A1 | 3/2007 | Hosek et al. | |
| 2008/0079759 | A1 | 4/2008 | Nagashima | |
| 2010/0126365 | A1 * | 5/2010 | Veismann et al. | 101/216 |

FOREIGN PATENT DOCUMENTS

| | | | |
|---|---|---|---|
| EP | 849574 | A2 * | 6/1998 |
| EP | 0 857 944 | A1 | 8/1998 |
| EP | 1 323 538 | A1 | 7/2003 |
| JP | 2002186281 | A * | 6/2002 |
| JP | 2002277799 | A * | 9/2002 |
| JP | 2005161712 | A * | 6/2005 |
| JP | 2006245847 | A * | 9/2006 |
| WO | WO 2006/017800 | A2 | 2/2006 |

* cited by examiner

APPARATUS AND METHOD FOR CHARACTERIZATION AND CONTROL OF USAGE DISTURBANCES IN A USAGE ENVIRONMENT OF PRINTERS AND OTHER DYNAMIC SYSTEMS

BACKGROUND OF THE INVENTION

1. Field of the Invention

The present invention relates generally to a system, method, and computer program product for characterizing and controlling usage disturbances, such as shake and noise, caused by moving parts in dynamic systems, in an operator's usage environment.

2. Description of the Related Art

Dynamic systems, or equipment with moving parts, generally have some degree of control built in to provide the primary function of the dynamic system and to prevent damage to the equipment or a hazard in the usage environment caused by the moving parts. Characterization of the dynamic system and tuning of the control is normally done in the manufacturing setting to determine and implement a particular degree of control prior to sending the equipment to the ultimate operator or user.

One reason characterization has been done in the manufacturing setting is because the characterization process itself can be dangerous to both the dynamic system and the operator. Because one purpose of the characterization process may be to determine the operating limits of the dynamic system by attempting to operate the dynamic system at or near those limits, it is possible that the operating limits of the dynamic system can be exceeded instead, thereby creating a potential hazard to both the dynamic system and anyone or anything in its vicinity.

However, while characterizing dynamic systems in the manufacturing setting is usually sufficient to provide basic functionality, it precludes characterizing and controlling the contribution of an operator's usage environment. The usage environment will often add to or exacerbate usage disturbances in dynamic systems.

SUMMARY OF THE INVENTION

The inventors recognized a need for a safe method and apparatus for characterizing usage disturbances in dynamic systems so that the characterization and control can be performed in the ultimate usage environments of the dynamic systems.

By allowing safe characterization and control in the usage environment, the dynamic systems can be operated in a less disturbing manner, through control, without changing the basic design of the dynamic systems.

Further, by allowing an operator to select a degree of control, based, for example, on whether the usage environment is capable of tolerating (or whether a user is willing to tolerate) a high degree of disturbance, each operator can select the degree of control of usage disturbances and the use of resources for control.

A method of characterizing usage disturbance, such as shake, in a dynamic system that allows for characterization in the usage environment according to one aspect of the present invention includes exciting the usage disturbances in the dynamic system using a pseudo-random binary sequence to generate positions for the moving parts of the dynamic systems within the tolerance of the dynamic system driving mechanism; measuring the usage disturbances in the dynamic system; and analyzing the measured usage disturbances in a frequency domain or a time domain.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

To provide a detailed explanation of the apparatus and method of the present invention, control of shake in a usage environment of a printer is discussed. However, one of skill in the art will readily understand the applicability of the discussion to the control of usage disturbances in other dynamic systems.

Figure 1:
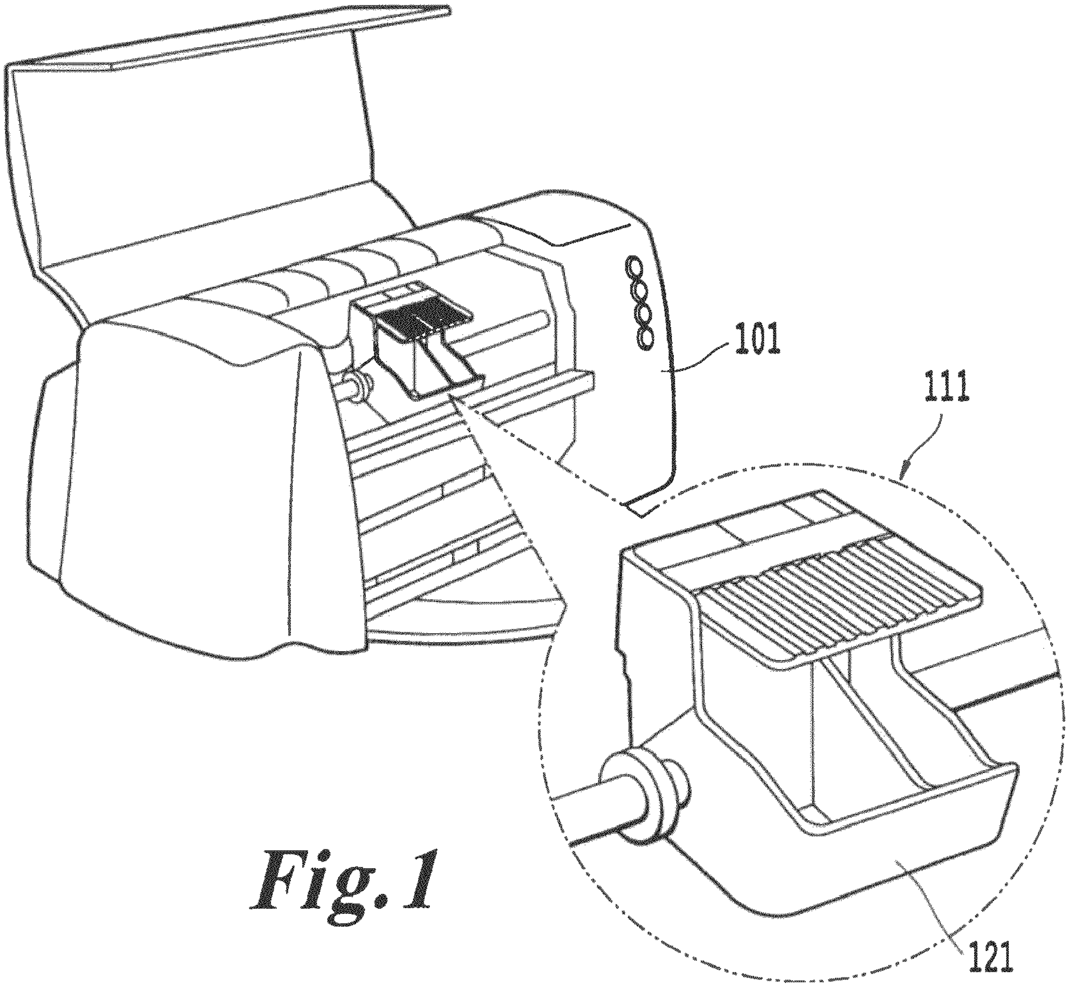
FIG. 1 depicts a printer with a carriage assembly including multiple print heads.

FIG. 1 depicts a printer 101 with a carriage assembly 111 that holds and moves at least one print head in housing 121. The print heads in housing 121 form an image on paper. A printer is, by itself, one form of an image forming device. However, an image forming apparatus can be multifunctional and include, for example, scanning, copying, and facsimile functions.

Most image processing and image forming devices include a print function. Printers with accelerating mass, from movement of the print carriage assembly, for example, can generate net reaction forces resulting in shake of the printer as well as the table on which the image forming device is located.

Several factors drive the printer design to higher accelerations with correspondingly high net reaction forces. Reducing the turn-around distance (for reversing carriage direction) results in a more compact printer but with higher accelerations. Running in the higher-speed draft mode results in higher accelerations. Increasing the pages-per-minute capability of the printer results in higher carriage speed and acceleration. Increasing the dots-per-inch specification results in greater sensitivity to shake. Often printers are factory tuned to work in a majority of environments which results in slower operation. Tuning to the actual usage environment allows for optimization of performance subject to the constraints imposed by the actual usage environment.

In addition to structural vibrations or modes that depend only on the printer, shake dynamics can depend on interaction with the usage environment. The shake associated with a printer on a table can depend on the characteristics of the table, other objects on the table, and characteristics of the floor and floor covering on which the table stands. Printer shake can be excited by a variety of sources such as: net reaction force from an accelerating carriage system within the printer, a torque variation from motor cogging, and an external disturbance from a vibrating floor.

The resulting shake can affect the user, the printer, and the environment. The user may be annoyed or fatigued by movement of other objects on the same table as the printer such as LCD movement, keyboard movement, and writing paper movement. The user perception of printer quality is degraded by shake and related noise (i.e., noise from the printer or creaking of the table).

Print quality can be degraded by variations in print head position, velocity, and acceleration related to shake. For example, a droplet may be fired at an incorrect position, a droplet trajectory may be altered by a horizontal component of velocity variation, and droplet formation may be affected by horizontal acceleration variation. Vibration and acceleration can lead to pressure variation in feed lines affecting droplet formation.

Shake generally increases wear and tear on the printer and makes the carriage servo system work harder to reduce shake-related disturbances leading to lower efficiency and higher power consumption. Shake increases wear and tear on the table often making the problem change over time as the table looses stiffness.

When an image forming device is manufactured, the conditions taken into account at the manufacturing facility, for example, to select settings in the servo system and other parts of the image forming device to minimize shake during operation may not accurately reflect the environment in which the image forming device will ultimately be used. Therefore, any steps taken to mitigate shake prior to purchase and use of the image forming device may not prove effective in the actual usage environment.

One approach to controlling shake has been suggested in WO 2006/017800 to include multiple print heads to reduce the required acceleration for the carriage and, thereby, the net reaction forces. Another approach suggested by EP 0 219 828 B1 is a counterbalance mechanism to cancel net reaction forces. However, these approaches are a one-time solution that do not allow for selective control of shake based on an operator's preference or on a particular usage environment and tend to increase cost.

Passive mechanical means to isolate the carriage from vibrations transmitted by the drive system may improve print quality but do not allow for selective control of shake and do not mitigate table shake. For example, in U.S. Pat. No. 4,573,363, kinematic application of force and added damping materials serve as a vibration isolator. In U.S. Pat. No. 5,924,809, a tuned spring serves as a vibration isolator. In U.S. Pat. No. 5,964,542, a pivotal connection between the drive belt and the carriage serves as a vibration isolator. In U.S. Pat. No. 6,004,050, a spring connection between the drive belt and carriage serves as a vibration isolator. In U.S. Pat. No. 6,244,765 B1, an I-shaped cross-section resilient member between the drive belt and the carriage serves as a vibration isolator.

An approach for improving print quality involves keeping the carriage movement speed constant. Vibrations transmitted via the drive system to the carriage result in minute speed variations that may be amplified by the carriage motion control system. EP 1 323 538 A1 describes a speed feedback signal which is filtered to remove the frequency component, thereby avoiding amplification of the minute speed variations corresponding to the frequency component. However, control of the constant speed portion of carriage motion rather than the transient portion of carriage motion does not effectively control table or print mechanism shake.

EP 0 857 944 A1 describes a method of detecting and controlling vibration in a printer. Partially transparent light beam detectors are attached to vibration susceptible structural elements (e.g. a side panel on a large printer) to measure structural vibration. Motion control units are connected to the detectors to control or damp detected vibrations in real time. However, because the motion control units operate on the vibration detected at the time of control, both detection and control must be done together for each print session for which vibration control is desired rather than characterization being done beforehand with only the control done for each print session. Additionally, this technique does not address table shake.

While it is counterintuitive, it is important to note that increasing table stiffness may not necessarily reduce table shake. It is possible to use a stiffer table and have increased table shake. The important relationship is the relationship between the table natural frequency in the usage environment as compared with the excitation frequencies of the printing trajectory (i.e. acceleration as a function of time). For example, if a particular print mode drives the printer with energy at 6 hz, then increasing a table's stiffness to move the natural frequency of the fully loaded table from 4 hz to 6 hz would increase the table shake.

In a related field, self-tuning control, using proportional-integral-derivative controllers or "PID loops", for example, selects PID gains for a closed loop control based on servo performance metrics such as settle time, peak overshoot, and stability margin. However, while such tuning or control of the control mechanism improves the controller's performance, it does not alter the controller's behavior to address usage disturbances in different usage environments that the controller was not already set up to address, because the gain adjustment is not based on usage disturbance metrics. Thus, self-tuning control can enhance control of usage disturbances by improving performance of the controller but does not preclude or replace characterization and control of usage disturbances in a given usage environment.

The present invention addresses, among other things, the problems identified above.

Figure 2:
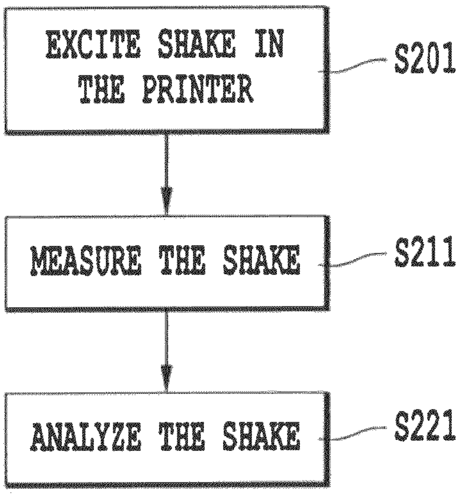
FIG. 2 is a flow chart illustrating an embodiment of the characterization process of the present invention.

Referring now to the drawings, wherein like reference numerals designate identical or corresponding parts throughout the several views. FIG. 2 depicts the steps involved in characterization of the shake. At step S201, the shake is excited. At step S211, the shake is measured and, at step S221, the measured shake is analyzed. Each of these steps is described in more detail below.

Excitation of shake at step S201 can be accomplished internal to the printer by controlling the carriage servo, for example, or external to the printer by physically shaking the image forming device housing or the table on which it is positioned, for example.

Figure 3:
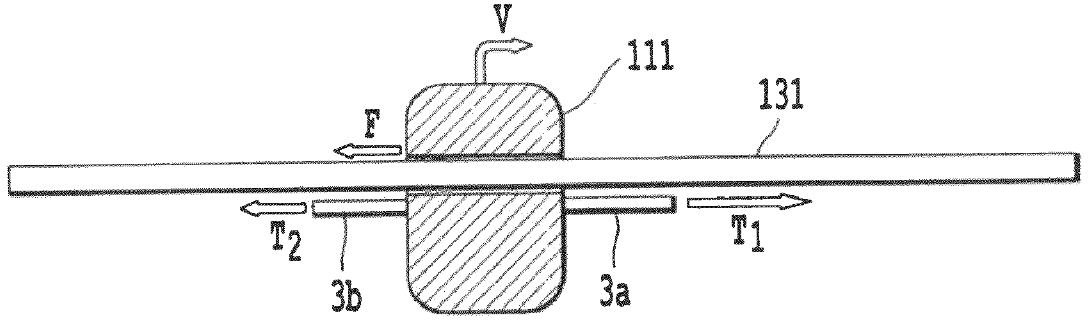
FIG. 3 depicts components of net excitation force on the carriage assembly during a print process.

FIG. 3 depicts the carriage assembly 111 and a guide rod 131. The net excitation force applied to the printer is the vector sum of the drive train driving force, for moving the carriage assembly 111 with a velocity V, and the guide bar friction force F.

The relationship between applied excitation and net excitation force should be accounted for in order to correctly induce and characterize the resulting shake. Guide bar friction can affect the proportionality between carriage motor torque and carriage acceleration. Motor torque is also not necessarily proportional to motor current due to cogging and commutation effects within the carriage motor and ripple due to belt teeth. T1 and T2 are the tensions exerted by belt ends 3*a* and 3*b* Thus, because of the non-linear relationships between the applied forces and resulting shake, shake should not only be excited but, also, the net excitation force may need to be back-calculated or measured.

Additionally, during excitation, the carriage assembly 111 should not be made to exceed allowable travel, which often is limited by the length of the guide rod 131. The application of a constant current sine sweep (or chirp) to the carriage motor will cause excessive travel at low frequency; insufficient travel, due to friction dominating, at high frequency; and the additional potential for position drift and resultant overtravel.

Also, during excitation, the actuator or drive train stress limits should not be exceeded. A constant displacement sine sweep (or chirp) causes excessive actuator and drive train stress at high frequency, potentially exceeding mechanical or electrical capability. Some examples of exceeding the mechanical limits include: belt skipping, mechanical breakage, and loss of feedback signal. Some examples of exceeding the electrical limits include: current saturation, voltage saturation, and burning out electrical components. Most importantly, the limits imposed by the user environment should not be exceeded. In the case of table shake, excessively shaking the table (excessive amplitude) during excitation could damage the table.

In a non-limiting embodiment of the present invention, in order to attain both a broad range of travel of the carriage assembly 111 on the guide rod 131, without overtravel, and limited stress on the actuator and drive train of the carriage servo, shake can be excited by using the carriage servo to perform a special test in the following manner. A pseudo-random binary (PRB) sequence can be used to generate position commands for the carriage servo which prevent the carriage from exceeding travel and stress limitations during the exciting step.

Figure 4:
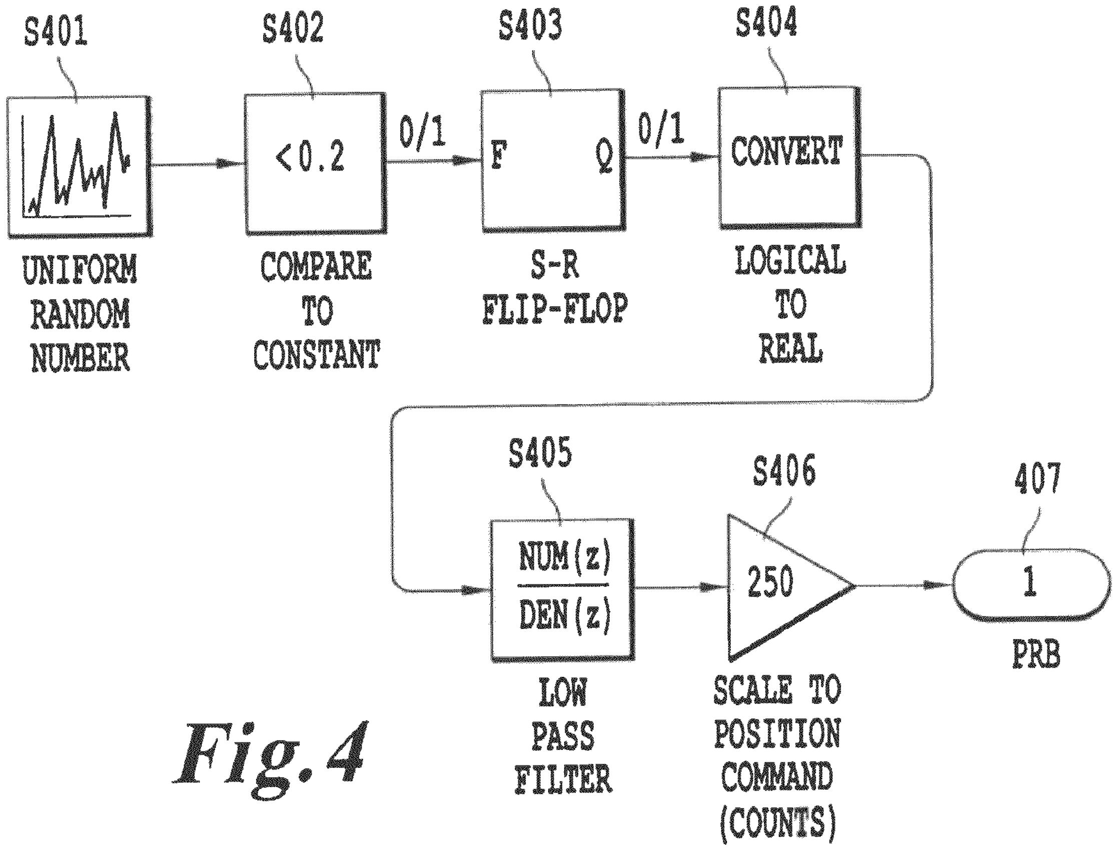
FIG. 4 depicts a pseudo-random binary (PRB) sequence generator for exciting shake of an image forming apparatus according to an embodiment of the invention.

As depicted in FIG. 4, a PRB position command sequence for excitation of shake according to an embodiment of the invention can be generated as follows. A sequence of uniform random numbers in the range [0, 1] are generated at step S401. Each generated random number is compared to a threshold (e.g. 0.2) at step S402. If the threshold is exceeded, then the output is toggled from 0 to 1 or from 1 to 0 as appropriate at step S403. The output is converted to a real number at step S404, low pass filtered (e.g. 10 Hz 2nd order Bessel) at step S405, and scaled (e.g. multiplied by 250 encoder counts) at step S406 to avoid exceeding the system stress limits. The carriage position command sequence value thus generated 407 is band-limited "white" noise except for coloration due to the filter.

Using a PRB position command sequence to excite the printer avoids exceeding the system stress limits and avoids exceeding carriage position limits, and the position servo system rejects the guide bar friction disturbance while providing broad-band excitation of shake. Using excitation that is broad band and rejects friction simplifies the subsequent analysis of the shake by avoiding the need for back-calculation or measurement of the excitation force. The calculations are simplified because the PRB could be assumed to be a "white noise" input for many applications.

Using a constant-power variable-amplitude sine sweep to position the carriage such that amplitude is decreased as frequency is increased would also avoid exceeding the system stress limits while providing sufficient excitation of the printer for characterization in a given usage environment.

Another way to excite shake using the carriage servo is to drive the carriage 111 as is normally done during printing or scanning. If shake is an issue during normal operation then this method can be used to excite the shake. Although, this approach may not result in a broad band excitation.

Yet another way to excite shake is to incorporate a shaker into the printer structure. For example, a simple two position shaker can be formed using a multi-position (e.g. Guardian Electric, multi-position solenoid), bi-stable or latching solenoid attached to a reaction mass. The PRB sequence described above in step S402 would be used to toggle the state of the solenoid and thus excite the shake. Alternatively, external excitation could be provided to the system either by a dedicated device or by using the user as an external input.

Lastly, a conventional sine sweep or some other means may be used as long as the amplitude is limited so as to not cause damage and the effects of friction are accounted for.

Once the excitation process has completed, then the shake in response to the net excitation force can be measured. If an accelerometer is used to measure carriage acceleration, which is proportional to the net excitation force leading to shake, then that accelerometer would be an additional sensor that must be added. The native strip-encoder position-measurement can be differentiated twice to obtain the relative acceleration between the print head carriage and the printer body. However, the method is numerically difficult because the noise due to quantization in time and space is accentuated. Further, relative acceleration is not the best measure, but, rather, absolute acceleration.

In certain cases, it is possible to use a sensor native to or pre-existing in the printer to measure the shake in response to the net excitation force. For example, rigid body motion of the printer creates an inertial disturbance force on the carriage servo that can be used to characterize the response to the excitation. Using the native strip encoder, the resonance associated with table shake manifests itself as a zero in the transfer function from position command input to position output as measured by the strip encoder. This measurement can be improved by using encoder optics with interpolated A/B sin/cosine outputs and an encoder sampling rate greater than the servo rate.

An alignment sensor native to the printer may be used on its own or combined with a printed test pattern to form a position sensor to measure the inertial disturbance. Printers include an alignment sensor for performing alignment of multiple print heads at, for example, system initial setup and after replacement of one or more of the cartridges. In another non-limiting embodiment, the alignment sensor's measurement, which is needed to correct for misalignment, could be used as a measure of the shake induced by the net excitation force.

In yet another non-limiting embodiment, when the image forming device includes a scanning device, a printed test pattern can then be scanned and subsequently analyzed within the printer to characterize the shake. For example, while repeatedly firing a single print nozzle and while the media feed operates at constant velocity, the print head can be rapidly re-positioned to the center of the page thereby generating a printed line-art image of the step response. For this test, a print carriage servo would preferably have increased sensitivity to inertial disturbances, and an image interpolation would preferably be above the optical resolution.

In another non-limiting embodiment, a sensor can be added to the printer to measure the response. For example, an accelerometer or a geophone can be incorporated into the printer structure, or a force sensor can be used to measure the interaction force between the printer and the table by instrumenting the printer feet. Alternatively, a sensor such as an accelerometer or geophone could be added to the table on which the printer resides.

Figure 5A:
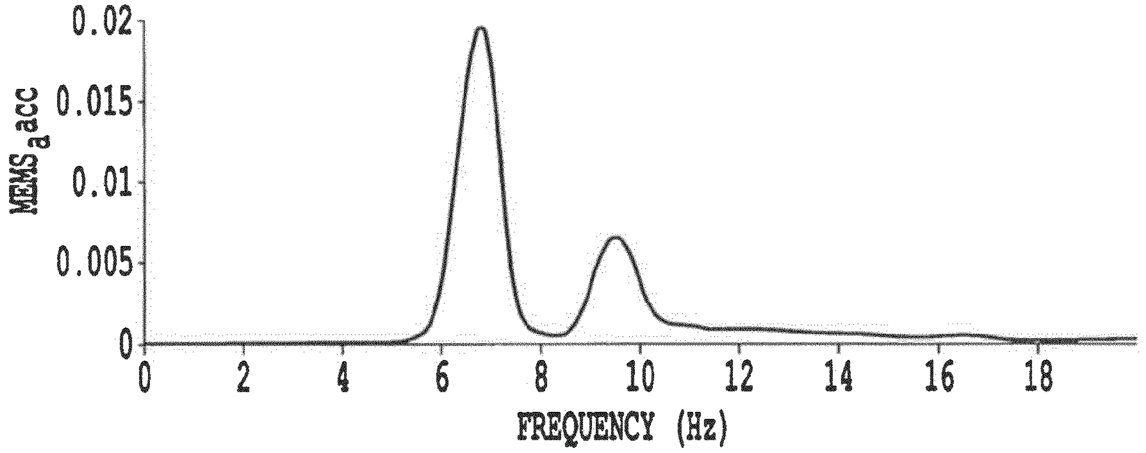
FIGS. 5*a* and 5*b* depict frequency response of shake measured with an accelerometer on a table supporting a printer and within the printer, mounted to the printer housing, respectively.
Figure 5B:
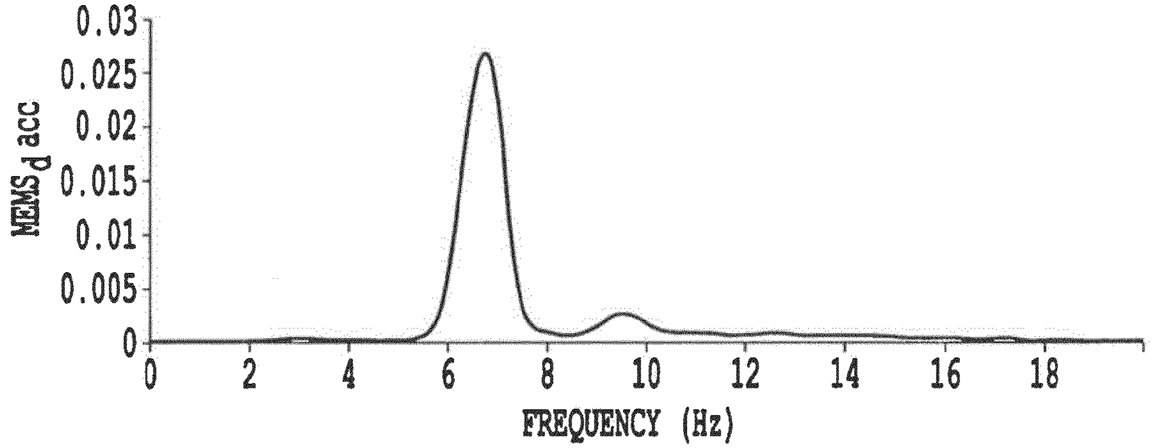

FIGS. 5*a* and 5*b* depict accelerometer outputs in the frequency domain for an accelerometer on the table supporting the printer and an accelerometer mounted to the housing of the printer, respectively.

If the PRB sequence was used for the excitation, the excitation can be assumed uniform and the response analyzed in the frequency domain for peaking. The peaks, depicted at approximately 7 Hz at FIG. 5, for example, can be further analyzed to determine the frequency and damping.

If a step or impulse function characterizes the carriage servo current used for the excitation, then the character of the net excitation force is known and the response can be analyzed in either the frequency domain or the time domain.

The analysis described above assumes that the excitation, measurement and analysis occur in a batch mode. That is, the characterization occurs separate from the normal operations of the printer. However, it is not necessary to perform the characterization using a batch mode. Those skilled in the art of system identification realize that, if the normal carriage motion is used as the excitation, then the measurement and analysis can be carried out in real time during normal printing operations.

Regardless of whether characterization of shake is done in batch mode or in real time in conjunction with normal printing, the subsequent process of reducing shake may speed up or slow the print process. Thus, the control of the shake can be implemented in a manner that allows a user of the image forming apparatus to determine whether and how much shake should be controlled.

Figure 6A:
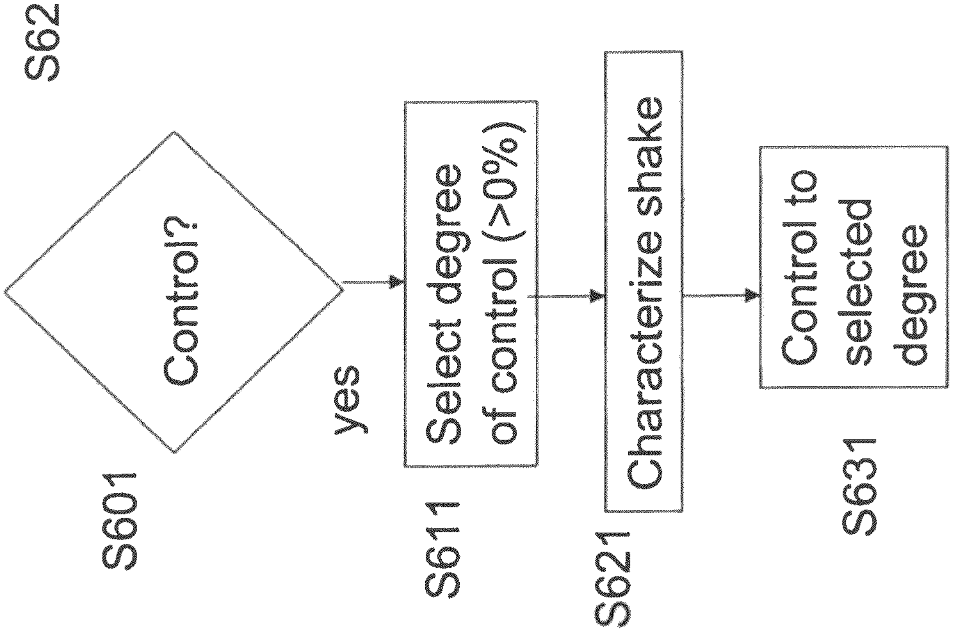
FIGS. 6*a*-6*c* show different modes of selective control of shake.
Figure 6B:
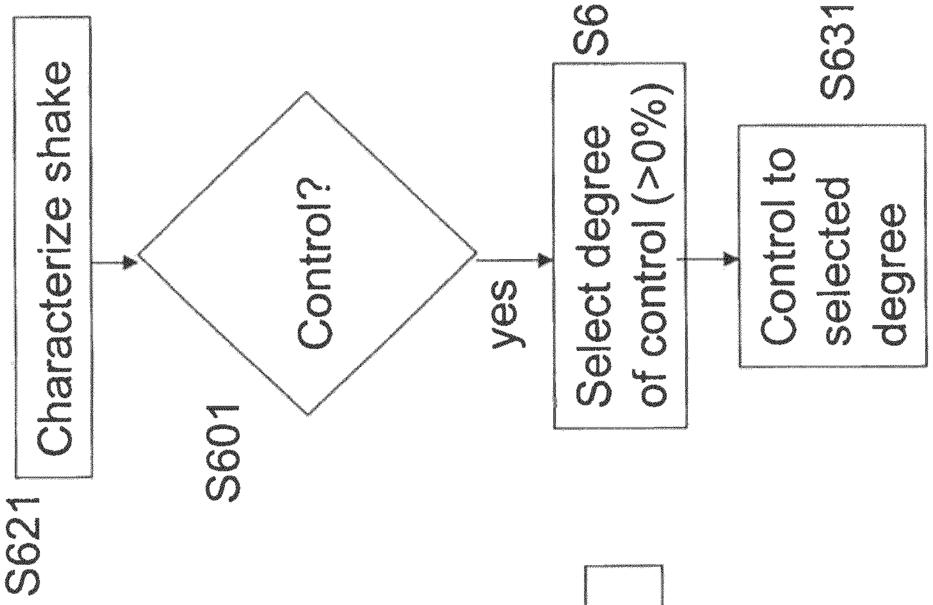
Figure 6C:
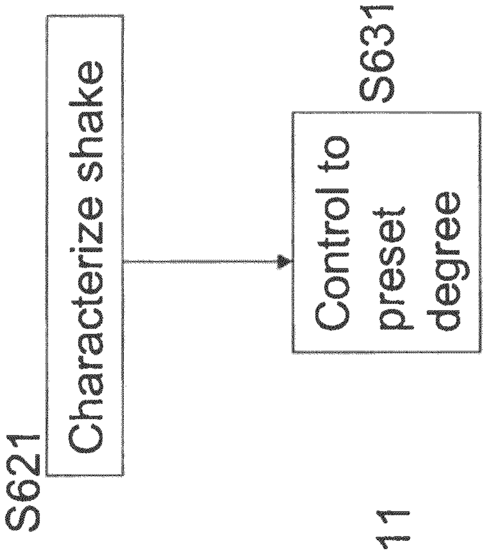

FIGS. 6*a*-6*c* depict three non-limiting embodiments for selectively controlling the characterized shake. The decision step S601 of the operator selecting whether and how much control of shake should be implemented may be done by the user through a graphical user interface (GUI) on the image forming device or external to it and connected directly or via a wired or wireless connection or network. However, although only three options are depicted, combinations and variations placing the decision box within the characterization steps are also possible. Further, a decision box allowing selection only of whether control should be implemented, rather than additionally allowing selection of how much control should be implemented, is also possible. One non-limiting example is software on a desktop or laptop computer that presents a screen to the user to make selections of settings. The computer then sends instructions to a printer to implement those settings.

The user input itself could be accomplished in a number of ways. For example, a GUI in the form of buttons, an LCD or screen, and/or a touch screen located on the printer could be used by the operator to make the selections described above of whether and how much control to implement. The user-interface described in U.S. Pat. No. 6,314,473 is incorporated in its entirety herein by reference.

Alternatively, a User Interface (UI) consisting of any combination of buttons, jumpers, LEDs, displays, voice commands, or other user input and/or output elements may be used to implement the selection feature.

Some steps in the characterization could be eliminated altogether by allowing a user to perform a type of manual characterization. The manual characterization could be done by applying a chirp, sweeping through frequencies of 4 Hz, 6 Hz, 8 Hz, etc., for example, to the carriage motor until the operator indicates, with a press of a button, for example, the frequency at which shake has reached relatively too high of a level with respect to that user's preference. That indicated frequency would be used in the control of the printer thereafter.

Manual characterization could also be done with a test print or by initiating movement of the carriage assembly 111 in some other manner until the operator indicates the required control by some manner. As one non-limiting example, the printer can move the print head (either while printing or not) while the printer changes the frequencies for which it is controlling. This can be accomplished by using any one of the prior art techniques for Input Shaping™ or any technique that changes the excitation frequency of the printer motion. The user can then choose the best mode of operation (possibly by pressing a button or a keyboard key or equivalent). The printer can thereby characterize the user environment by using the user as a sensor.

FIG. 6*a* depicts a non-limiting embodiment in which the user can select the degree of control of shake S611 before characterization is done. In this case, the characterization step S621, which includes the steps depicted at FIG. 2, is not done at all if the user chooses no control of the shake at the decision step S601. Depending on the support base and location of the image forming device, a user may choose little or no control of the shake.

Recalibration of the control could be done in a number of ways. Re-characterization could be performed automatically, initiated by similar or the same events that trigger realignment in a printer, for example, and by any other predetermined events. Recalibration could also be initiated by an operator based on a perceived change in the effectiveness of the selected control, for example. Alternatively, when performance degradation is measured with internal or external sensors, a recalibration could be triggered.

In general the controlling step S631 involves modification of the carriage servo commands or carriage servo as opposed to a mechanical approach such as reducing net reaction force through counterbalancing or use of multiple print carriages, or mechanical modifications that serve to isolate the print head from transmitted vibration. The carriage servo architecture could be modified, as well, through, for example, the introduction of a filter, compensator, or alternative tuning of parameters. Alternatively, the velocity of the print head, the turnaround time, and/or the acceleration (or any combination thereof) may be changed to cause a reduction in shake. These changes are not limited to reductions. As described above, speeding up the print operation may reduce shake because the excitation frequency would no longer be aligned with the frequencies measured in the usage environment.

Controlling shake by modifying the servo command sequence is discussed, for example, in U.S. Pat. Nos. 4,916,635 and 5,638,267, both of which are fully incorporated herein by reference.

Other techniques for reducing vibrations in dynamic systems are discussed in U.S. Pat. Nos. 6,314,473 and 6,560,658, and 7,433,144, all of which are also fully incorporated by reference.

Different modes of operation that allow an operator to prioritize speed, quiet operation or minimal vibration are discussed in U.S. Pub. No. 2002/0015163, which is also fully incorporated by reference.

In a non-limiting embodiment, the carriage servo command, which specifies position and speed of the carriage, may be used to slow the carriage movement for a particular frequency of carriage movement or a particular change in position based on the analysis during the characterization step. The degree of this control, as discussed above, could depend on the user's preference.

Additionally, microprocessors used to perform the methods of the present invention utilize a computer readable storage medium, such as a memory (e.g. ROM, EPROM, EEPROM, flash memory, static memory, DRAM, SDRAM, and their equivalents), but, in an alternate embodiment, further include or exclusively include a logic device for augmenting or fully implementing the present invention. Such a logic device includes, but is not limited to, an application-specific integrated circuit (ASIC), a field programmable gate array (FPGA), a generic-array of logic (GAL), and their equivalents. The microprocessors can be separate devices or a single processing mechanism.

The term "external sensors" as it is used in this patent and its claims refers to sensors that are not usually part of the original printer. The sensor may or may not be located inside the printer and is often a part of the printer. For example, the addition of an accelerometer inside the case of the printer is an "external sensor".

The term "internal sensor" as it is used in this patent and its claims refers to sensors that are usually part of the original printer. Examples of internal sensors are the encoder used to measure the head location and the print head alignment sensor. These are "internal" sensors because they already are part of the system prior to the addition of the claimed invention.

The term "shake" or "printer shake" as discussed herein refers to vibration of the entire printer in its usage environment, such as the printer on its table, in the way in which it is intended to be used. It is understood that shake of the printer on its table will contribute to vibrations within the printer as well. This is why the encoder may be used as a sensor for external printer shake.

Obviously, numerous modifications and variations of the present invention are possible in light of the above teachings. It is therefore to be understood that within the scope of the appended claims, the invention may be practiced otherwise than as specifically described herein.

What is claimed is:

1. A method of characterizing and controlling usage disturbances including at least one of shake and noise, in a dynamic system including at least one moving part of an image forming apparatus, the method allowing characterization in a usage environment and comprising:

exciting, in the usage environment at least one usage disturbance including at least one of shake and noise, with an excitation force applied to the at least one moving part of the image forming apparatus, the excitation force sufficiently small so as not to cause at least one of mechanical drive train failure or skipping, losing position feedback signal, mechanical breakage or burn out of electrical components;

measuring the usage disturbances due to interaction of the image forming apparatus with the usage environment in the dynamic system; and analyzing the measured usage disturbances in a frequency domain or a time domain;

controlling the usage disturbances with a controller of the image forming apparatus of the dynamic system based on the analyzing.

2. The method according to claim 1, wherein the exciting step includes positioning the at least one moving part according to a constant-power variable-amplitude sine sweep, amplitude of the sine sweep decreasing as frequency increases.

3. The method according to claim 1, wherein the controller is a self-tuning controller.

4. A method of characterizing usage disturbances including at least one of shake and noise, in a dynamic system including at least one moving part of an image forming apparatus, the method allowing characterization in a usage environment of a user and comprising:

exciting, in the usage environment the usage disturbances including at least one of shake and noise, with a pseudo-random binary sequence to generate positions for the at least one moving part of the dynamic system within a tolerance of the driving mechanism of the image forming apparatus;

measuring the usage disturbances due to interaction of the image forming apparatus with the usage environment in the dynamic system;

analyzing the measured usage disturbances in a frequency domain or a time domain; and controlling the usage disturbances with a controller of the image forming apparatus of the dynamic system based on the analyzing.

5. A method of characterizing shake of an image forming apparatus located on a support in the usage environment comprising:

exciting the shake in at least one of the image forming apparatus or the support in a usage environment;

measuring the shake in at least one of the image forming apparatus or the support;

analyzing the measured shake in a frequency domain or a time domain; and controlling usage disturbances due to interaction of the image forming apparatus with the usage environment with a controller of the image forming apparatus based on the analyzing.

6. The method of claim 5, wherein the exciting step includes generating predetermined position commands for a carriage servo motor of the image forming apparatus.

7. The method of claim 6, wherein a pseudo-random binary sequence is used in the generating predetermined position commands step.

8. The method of claim 6, wherein a constant-power variable-amplitude sine sweep is used in the generating predetermined position commands step, and the amplitude of the sine sweep is decreased as frequency increases.

9. The method of claim 5, wherein the exciting step includes a shaking mechanism external to the image forming apparatus.

10. The method of claim 5, wherein the measuring step includes using the measured shake to determine the excitation, or measurement of net excitation forces resulting from the exciting step.

11. The method of claim 10, wherein the exciting step includes an additional measuring of acceleration of a carriage.

12. The method of claim 5, wherein the measuring step includes using a sensor native to the image forming apparatus.

13. The method of claim 12, wherein the measuring step uses a print head alignment sensor to measure the shake, and repositioning the print heads based on the measured misalignment.

14. The method of claim 12, wherein the measuring step uses an encoder, the encoder providing carriage position information.

15. The method of claim 5, wherein the measuring step includes measuring with a sensor external to the image processing apparatus.

16. The method of claim 5, further inputting a degree of control of the shake; and controlling a carriage servo to control the characterized shake to the degree of control specified by an operator.

17. A method of claim 16, wherein the characterizing occurs after the degree of control is input by the operator.

18. A computer-readable storage medium for storing a program therein that, when executed by a processor, causes the processor to perform the steps of:

exciting a shake in an image forming apparatus in a usage environment;

measuring the shake in the image forming apparatus;

analyzing the measured shake in a frequency domain or a time domain; and controlling usage disturbances due to interaction of the image forming apparatus with the usage environment with a controller of the image forming apparatus based on the analyzing.

19. The computer-readable storage medium of claim 18, wherein the processor is a processor of the image forming apparatus.

20. An image forming apparatus configured to control shake during print operation, the apparatus comprising:

a controller configured to:

excite shake in the image forming apparatus in a usage environment, analyze the shake measured by a sensor in a time domain or a frequency domain, and control the shake due to interaction of the image forming apparatus with the usage environment by modifying carriage servo commands based on the analysis and a specified degree of control;

the sensor configured to measure the shake and provide the measurement to the controller; and an input device configured to receive an input of the specified degree of control desired.

21. The image forming apparatus of claim 20, wherein the sensor is native to the image forming apparatus.

22. The image forming apparatus of claim 20, wherein the sensor is external to the image forming apparatus.

23. The image forming apparatus of claim 20, wherein the input device is a user interface, including a display device, located within the image forming apparatus.

24. The image forming apparatus of claim 20, wherein the controller is operated manually based on an operator input.

25. The image forming apparatus of claim 20, wherein the controller is operated automatically based on at least one of a period of time or a predetermined event.

26. A method of controlling shake in an image forming apparatus during print operation, the method comprising:

exciting shake in the image forming apparatus in a usage environment;

measuring the shake with a sensor;

analyzing the shake measured by the sensor in a time domain or a frequency domain; and controlling the shake due to interaction of the image forming apparatus with the usage environment by modifying carriage servo commands based on the analyzing and on a degree of control specified by a user of the image forming apparatus.

27. A method of manually setting control of usage disturbances in an image forming apparatus in a usage environment, the method comprising:

initiating in the usage environment, with input from an operator, a sine sweep for positioning a carriage of the image forming apparatus;

indicating, by the operator, a frequency at which a level of the usage disturbances is determined, by the operator, to exceed a desired level; and controlling the image forming apparatus at the indicated frequency to maintain the usage disturbances due to interaction of the image forming apparatus with the usage environment below the desired level.

* * * * *